United States Patent
Ogura et al.

(10) Patent No.: US 10,167,575 B2
(45) Date of Patent: Jan. 1, 2019

(54) NANOFIBER MANUFACTURING METHOD AND NANOFIBER MANUFACTURING DEVICE

(71) Applicant: FUJIFILM Corporation, Tokyo (JP)

(72) Inventors: Tooru Ogura, Kanagawa (JP); Yukihiro Katai, Kanagawa (JP); Toshinao Arai, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 136 days.

(21) Appl. No.: 15/409,536

(22) Filed: Jan. 19, 2017

(65) Prior Publication Data
US 2017/0130364 A1     May 11, 2017

Related U.S. Application Data

(63) Continuation of application No. PCT/JP2015/071062, filed on Jul. 24, 2015.

(30) Foreign Application Priority Data

Sep. 4, 2014   (JP) .................... 2014-180421

(51) Int. Cl.
D01D 1/02     (2006.01)
D01F 2/02     (2006.01)
(Continued)

(52) U.S. Cl.
CPC ....... D01D 5/0061 (2013.01); B29C 47/0866 (2013.01); B29C 47/0872 (2013.01);
(Continued)

(58) Field of Classification Search
CPC .. B29C 47/0866; B29C 47/0872; D01D 1/02; D01D 5/0038; D01D 5/0046; D01F 2/02;
(Continued)

(56) References Cited

U.S. PATENT DOCUMENTS

| 7,815,842 B2 | 10/2010 | Okuzaki et al. |
| 2011/0123661 A1* | 5/2011 | Deiss .................. B29C 47/0872 425/161 |

FOREIGN PATENT DOCUMENTS

| JP | 2005330624 | 12/2005 |
| JP | 2008196061 | 8/2008 |

(Continued)

OTHER PUBLICATIONS

"International Search Report (Form PCT/ISA/210) of PCT/JP2015/071062", dated Oct. 27, 2015, with English translation thereof, pp. 1-2.

(Continued)

Primary Examiner — Leo B Tentoni
(74) Attorney, Agent, or Firm — JCIPRNET

(57) ABSTRACT

The present invention provides a nanofiber manufacturing method and a nanofiber manufacturing device. A solution 25 in which a polymer is dissolved in a solvent is supplied from a distal end of a nozzle 16 to form a Taylor cone 44 at a distal end opening 16b. By applying a voltage between the solution 25 and a collector 50 using a power supply portion 62, an electrospinning jet 45 is sprayed from the Taylor cone 44 to the collector 50. At the start or stop of electrospinning, a blocking member 48 is inserted into a spraying area 42 of the electrospinning jet 45 such that an unstable electrospinning jet or unstable nanofibers are received. A product is not manufactured from an unstable electrospinning jet formed at the start or stop of electrospinning, and the manufacturing of a defective product is prevented.

12 Claims, 4 Drawing Sheets

(51) Int. Cl.
*D01D 5/00* (2006.01)
*B29C 47/08* (2006.01)
*D04H 1/067* (2012.01)
*D04H 1/728* (2012.01)
*D01F 2/28* (2006.01)
*D01F 2/30* (2006.01)

(52) U.S. Cl.
CPC ......... *D01D 5/0038* (2013.01); *D01D 5/0076* (2013.01); *D04H 1/067* (2013.01); *D04H 1/728* (2013.01); *D01D 5/0092* (2013.01); *D01F 2/28* (2013.01); *D01F 2/30* (2013.01); *D10B 2201/28* (2013.01)

(58) Field of Classification Search
CPC ......... D01F 2/28; D01F 2/30; D10B 2201/20; D10B 2201/22; D10B 2201/28
USPC .......................... 264/10, 464, 465, 466, 484
See application file for complete search history.

(56) References Cited

FOREIGN PATENT DOCUMENTS

| | | |
|---|---|---|
| JP | 2008202169 | 9/2008 |
| JP | 2008303499 | 12/2008 |
| JP | 2012122176 | 6/2012 |

OTHER PUBLICATIONS

"Written Opinion of the International Searching Authority of PCT/JP2015/071062", dated Oct. 15, 2015, with English translation thereof, pp. 1-8.

"Written Opinion of the International Searching Authority of PCT/JP2015/071062", dated Oct. 27, 2015, with English translation thereof, pp. 1-8.

\* cited by examiner

NANOFIBER MANUFACTURING METHOD AND NANOFIBER MANUFACTURING DEVICE

CROSS-REFERENCE TO RELATED APPLICATIONS

This application is a Continuation of PCT International Application No. PCT/JP2015/071062 filed on Jul. 24, 2015, which claims priority under 35 U.S.C § 119(a) to Japanese Patent Application No. 2014-180421 filed on Sep. 4, 2014. Each of the above application(s) is hereby expressly incorporated by reference, in its entirety, into the present application.

BACKGROUND OF THE INVENTION

1. Field of the Invention

The present invention relates to a nanofiber manufacturing method and a nanofiber manufacturing device.

2. Description of the Related Art

For example, fibers (nanofibers) having a nano-scale diameter of several nanometers or more and less than 1000 nm can be used as a material of a product such as a biofilter, a sensor, a fuel cell electrode material, a precision filter, an electronic paper, or wick of a heat pipe, and has been actively developed for use in various fields such as engineering and medical fields.

One of the methods of manufacturing nanofibers is an electrospinning method. The electrospinning method is performed using an electrospinning device including a nozzle, a collector, and a power supply portion (refer to JP2005-330624A). In this electrospinning device, a voltage is applied between the nozzle and the collector using the power supply such that, for example, the nozzle is negatively charged and the collector is positively charged.

In a case where a solution as a raw material is supplied from the nozzle in a state where a voltage is applied, a conical protrusion called a Taylor cone which is formed of the solution is formed at an opening of a distal end of the nozzle (hereinafter, also referred to as "distal end opening"). As the applied voltage is gradually increased such that the Coulomb force exceeds the surface tension of the solution, the solution is jetted from a distal end of the Taylor cone to form an electrospinning jet. The electrospinning jet moves to the collector due to the Coulomb force and is collected on the collector as nanofibers.

In a case where a highly volatile solvent is used in the solution supplied from the nozzle, the solution is solidified at the distal end opening, which may cause nozzle clogging. In addition, in a case where the solidified solution is separated from the distal end opening to some extent, the solidified solution may fall on a surface of the collector where nanofibers are collected. Due to the clogging or solidification of the solution, the quality of the nanofibers as a product deteriorates, and the nanofibers cannot be used as a product. Therefore, JP2008-202169A discloses a method using cleaning means in which the solidified solution is removed by bringing a flexible member into contact with the distal end opening or by sucking the distal end opening.

SUMMARY OF THE INVENTION

In the method disclosed in JP2008-202169A in which the solidified solution is removed by moving the nozzle to a cleaning station and bringing the flexible member into contact with the distal end opening, when the flexible member is brought into contact with the distal end opening, the solidified solution attached to the flexible member or the distal end opening may be scattered by the flexible member or the nozzle being bent and then returning to the original state. In a case where the solidified solution falls on a nanofiber layer of the collector, a defective product may be manufactured.

In addition, at the start or stop of electrospinning, a Taylor cone or an electrospinning jet may be unstable. Therefore, due to an unstable electrospinning jet, liquid falling in which the solution falls on the collector may occur, or fibers may be increased in size or may become unstable, and countermeasures for the above-described problems are required.

The present invention has been made in consideration of the above-described problems, and an object thereof is to provide a nanofiber manufacturing method and a nanofiber manufacturing device, in which unstable electrospinning can be prevented at the start or stop of electro spinning.

According to the present invention, there is provided a nanofiber manufacturing method comprising: supplying a solution in which a polymer is dissolved in a solvent from a distal end of a nozzle; applying a voltage between the solution and a collector; and spraying fibers from the solution to the collector, in which a blocking member is disposed so as to be movable between an insertion position, where the blocking member is inserted between the nozzle and the collector such that the fibers are received, and a retreat position, where the blocking member retreats from the insertion position such that the fibers are sprayed from the nozzle to the collector, and a voltage is applied between the nozzle and the blocking member in a state where the blocking member is positioned at the insertion position.

According to the present invention, there is provided a nanofiber manufacturing device where a solution in which a polymer is dissolved in a solvent is supplied from a distal end of a nozzle, a voltage is applied between the solution and a collector; and fibers are sprayed from the solution to the collector, the nanofiber manufacturing device comprising a blocking member, in which the blocking member is disposed movably between an insertion position, where the blocking member is inserted between the nozzle and the collector such that the fibers are received, and a retreat position, where the blocking member retreats from the insertion position such that the fibers are sprayed from the nozzle to the collector, and a voltage is applied between the nozzle and the blocking member in a state where the blocking member is positioned at the insertion position.

It is preferable that the blocking member is positioned at the retreat position during the manufacturing of the fibers and that the blocking member is positioned at the insertion position at the start and end of the manufacturing of the fibers. It is preferable that the voltage is applied in a state where a distal end of the blocking member reaches a spraying area of the fibers and that the voltage application is stopped in a state where the distal end of the blocking member passes the spraying area. In addition, it is preferable that the voltage application between the solution and the collector is stopped in a state where the voltage is applied between the solution and the blocking member. It is preferable that the polymer is a cellulose polymer.

According to the present invention, nanofibers in an unstable spinning state or liquid falling, which may occur at the start or end of electrospinning, can be prevented, and nanofibers with which no defective products are manufactured can be obtained.

DESCRIPTION OF THE PREFERRED EMBODIMENTS

Figure 1:
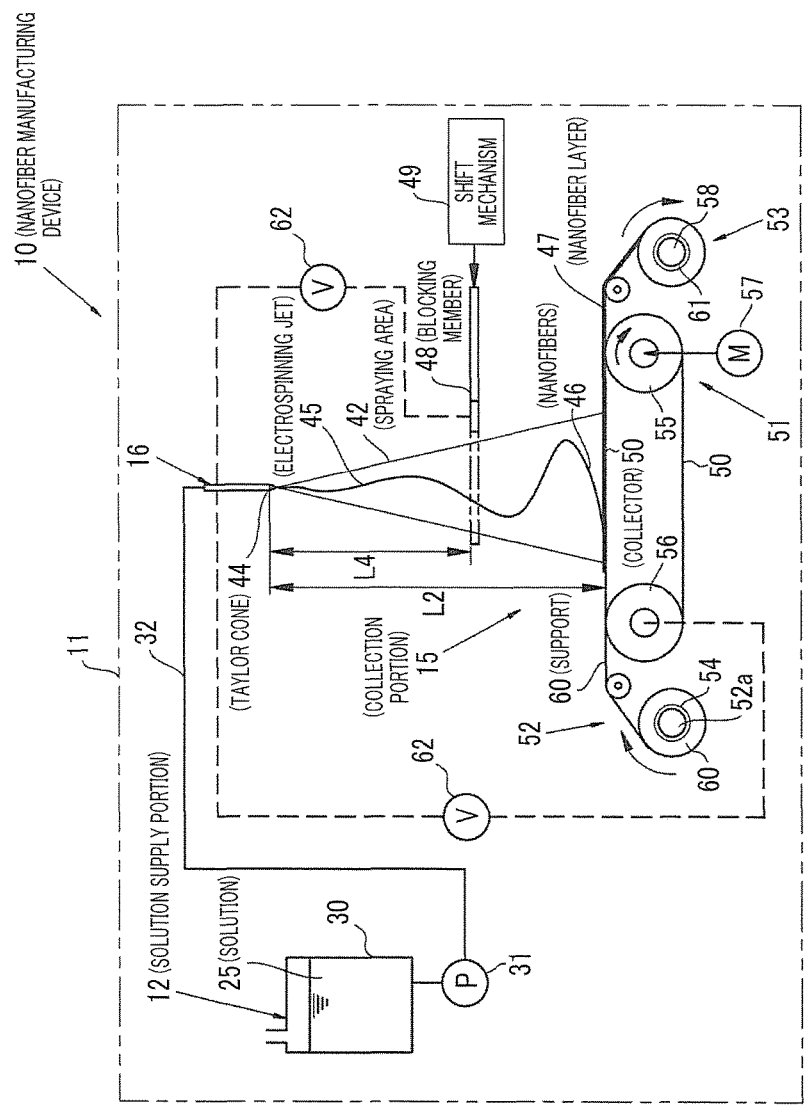
FIG. 1 is a side view schematically showing a nanofiber manufacturing device according to the present invention.

As shown in FIG. 1, a nanofiber manufacturing device 10 according to the present invention manufactures nanofibers 46 from a solution 25 in which a cellulose polymer is dissolved in a solvent. The nanofiber manufacturing device 10 includes an electrospinning chamber 11, a solution supply portion 12, an electrospinning nozzle (hereinafter, referred to simply as "nozzle") 16, a collection portion 15, and a power supply portion 62. The electrospinning chamber 11 is configured to accommodate the nozzle 16, the solution supply portion 12, the collection portion 15, and the like and to be sealable such that a solvent gas is prevented from leaking. The solvent gas is obtained by gasifying the solvent of the solution 25.

Figure 2:
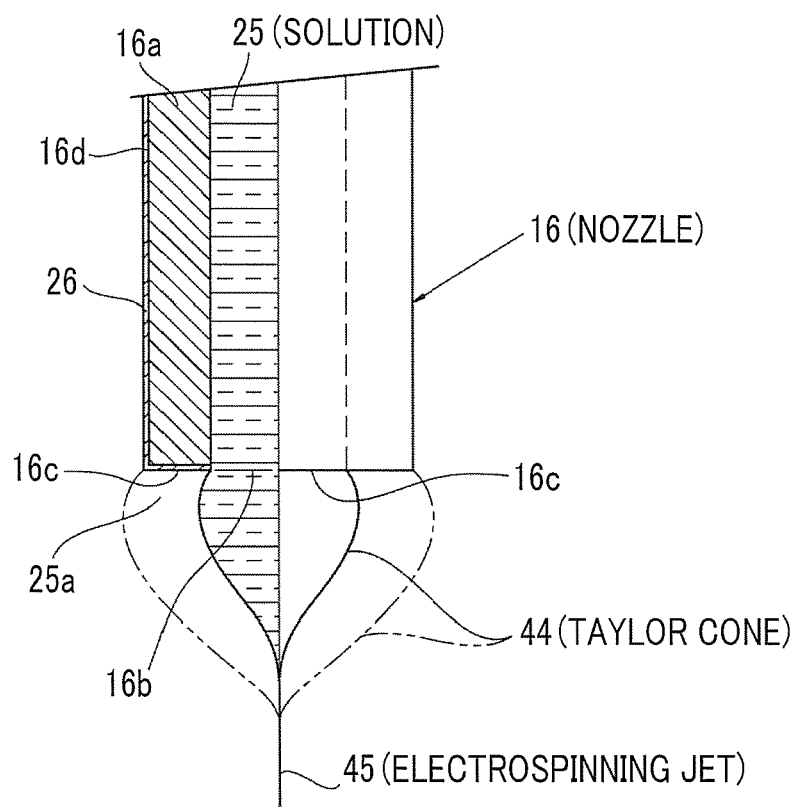
FIG. 2 is a side view showing a partial cross-section of an example of a nozzle and a Taylor cone.

The nozzle 16 is disposed above the electrospinning chamber 11. The nozzle 16 supplies the solution 25, for example, in a state where the nozzle 16 is negatively (−) charged by the power supply portion 62 as described below. As shown in FIG. 2, the nozzle 16 includes a nozzle main body 16a and a resin layer 26. The nozzle main body 16a is, for example, a stainless steel cylinder having an outer diameter of 0.55 mm and an inner diameter of 0.35 mm, in which an edge portion of a distal end opening around a distal end opening 16b forms a distal end flat surface 16c perpendicular to a cylinder center (center line) direction. The nozzle main body 16a may be formed of another conductive material such as an aluminum alloy, a copper alloy, or a titanium alloy instead of stainless steel.

A surface of a distal end portion of the nozzle 16 including the distal end flat surface 16c and an outer circumferential surface 16d is coated with the resin layer 26 formed of polytetrafluoroethylene (PTFE). The resin used is not limited to PTFE, and any resin such as other polyethylenes, polypropylene, silicone, or epoxy can be used as long as it is insoluble in the solvent used in the solution. A coating method is not particularly limited. The coating thickness is not particularly limited and is preferably 1 µm to 50 µm.

As shown in FIG. 1, a pipe 32 of the solution supply portion 12 is connected to a base end of the nozzle 16. The solution supply portion 12 supplies the solution 25 to the nozzle 16 of the electrospinning chamber 11. The solution supply portion 12 includes a storage container 30, a pump 31, and the pipe 32. The storage container 30 stores the solution 25 at a fixed temperature in a range of 5° C. to 40° C. As a result, the temperature of the solution 25 supplied from the nozzle 16 is adjusted to be in a range of 5° C. to 40° C. By adjusting the temperature of the solution 25 to be 5° C. or higher, incorporation of water into the storage container 30 caused by dew condensation is prevented, which is preferable as compared to a case where the temperature of the solution 25 is lower than 5° C. In addition, by adjusting the temperature of the solution 25 to be 40° C. or lower, evaporation of the solvent in the solution 25 is prevented, which is preferable as compared to a case where the temperature of the solution 25 is higher than 40° C.

The pump 31 supplies the solution 25 to the nozzle 16 through the pipe 32. By changing the rotation speed of the pump 31, the flow rate of the solution 25 supplied from the nozzle 16 can be adjusted. In the embodiment, the flow rate of the solution 25 is set as 4 cm$^3$/hr but is not limited thereto. Once the solution 25 is supplied to the nozzle 16 by the pump 31, as shown in FIG. 2, a substantially conical Taylor cone 44 formed of the solution 25 is formed at the distal end opening 16b of the nozzle 16. The solution supply portion 12 including the storage container 30 and the pump 31 is used. However, in a case where the amount of the solution 25 supplied to the nozzle 16 is small, a syringe (not shown) may be used.

As shown in FIG. 1, the collection portion 15 is disposed below the nozzle 16. The collection portion 15 includes a blocking member 48, a collector 50, a collector rotating portion 51, a support supply portion 52, and a support winding portion 53. In the collector 50, the solution 25 supplied from the nozzle 16 is collected as the nanofibers 46. The collector 50 is formed of a belt-shaped metal, for example, an endless stainless steel belt. The material of the collector 50 is not limited to stainless steel. For example, the collector 50 may be formed of a material which is charged by the power supply portion 62 applying a voltage thereto. The collector rotating portion 51 includes a pair of rollers 55 and 56 and a motor 57. The collector 50 is horizontally stretched between the pair of rollers 55 and 56. A motor 57 which is disposed outside of the electrospinning chamber 11 is connected to a shaft of the roller 55 such that the roller 55 is rotated at a predetermined speed. Due to this rotation, the collector 50 circulates and moves between the pair of rollers 55 and 56. In the embodiment, a moving speed of the collector 50 is set as 10 cm/hr, but the present invention is not limited thereto.

A support 60 formed of a belt-shaped aluminum sheet is supplied to the collector 50 by the support supply portion 52. The support 60 according to the embodiment has a thickness of about 25 µm. The support 60 is provided to collect the nanofibers 46 to obtain a nanofiber layer (non-woven fabric) 47. The support 60 on the collector 50 is wound by the support winding portion 53. The support supply portion 52 has a delivery shaft 52a. A support roll 54 is attachably and detachably mounted on the delivery shaft 52a. The support roll 54 has a configuration in which the support 60 is wound therearound. The support winding portion 53 has a winding shaft 58. The winding shaft 58 is rotated by a motor (not shown) and winds the support 60, on which the nanofiber layer 47 is formed, around a core 61 set in the winding shaft 58. In this way, the nanofiber manufacturing device 10 has a function of manufacturing the nanofibers 46 as well as a function of manufacturing non-woven fabric formed of the nanofiber layer 47, and performs the nanofiber manufacturing method using an electrospinning method. It is preferable that a moving speed of the collector 50 and a moving speed of the support 60 are adjusted to be the same in order to prevent friction between the collector 50 and the support 60. The support 60 may be placed on the collector 50 to be moved along with the movement of the collector 50. In addition, by applying a winding tension to the support 60, the support 60 may be linked with the collector 50.

The blocking member 48 is formed of a metal plate and is disposed parallel to the collector 50 so as to be movable between the nozzle 16 and the collector 50 by a guide mechanism (not shown). A shift mechanism 49 moves the blocking member 48 between an insertion position and a retreat position using a rack-and-pinion method, a link mechanism, and the like. At the insertion position, the blocking member 48 is positioned below the nozzle 16 and covers a spraying area 42 of an electrospinning jet 45. Therefore, the electrospinning jet 45 is blocked by the blocking member 48 and is not sprayed to the collector 50. At the retreat position, the blocking member 48 retreats from the insertion position and does not cover the spraying area 42 of the electrospinning jet 45. Therefore, the electrospinning jet 45 reaches the collector 50. On the blocking member 48, a cover sheet (not shown) formed of, for example, an aluminum sheet is placed. The cover sheet is provided to easily peel the received electrospinning jet 45 and the like off from the blocking member 48 when the electrospinning jet 45 and the like are wasted. In a case where the electrospinning jet 45 can be easily peeled off from the surface of the blocking member 48, the cover sheet may not be provided.

The power supply portion 62 applies a voltage of, for example, 35 kV between the nozzle 16 and the collector 50 such that, for example, the nozzle 16 is negatively (−) charged and the collector 50 is positively (+) charged. In addition, in the insertion state where the blocking member 48 is inserted into the insertion position, the voltage application to the collector 50 is stopped, and a voltage of, for example, 30 kV is applied between the nozzle 16 and the blocking member 48 such that the nozzle 16 is negatively charged and the blocking member 48 is positively charged. In a state where a voltage is applied between the nozzle 16 and the blocking member 48, the power supply portion 62 stops the voltage application between the nozzle 16 and the collector 50. The nozzle 16 has a charging polarity opposite to that of the collector 50 and the blocking member 48.

An appropriate value of a distance L2 between the distal end of the nozzle 16 and the collector 50 varies depending on the kinds of the polymer and the solvent and the solvent concentration. The distance L2 is preferably in a range of 30 mm to 300 mm and is set as 170 mm in the embodiment. By adjusting the distance L2 to be 30 mm or longer, as compared to a case where the distance L2 is shorter than 30 mm, the sprayed electrospinning jet 45 is more reliably broken due to repulsion caused by electric charges thereof until it reaches the collector 50. Therefore, fine nanofiber 46 can be more reliably obtained. By the electrospinning jet 45 being finely broken as described above, the solvent can be more reliably evaporated, and non-woven fabric and the like can be more reliably prevented from being sticky. In addition, by adjusting the distance L2 to be 300 mm or shorter, the applied voltage can be reduced to be lower than that in a case where the distance L2 is longer than 300 mm. Therefore, insulation breakdown of the device by applying a high voltage can be more reliably prevented, and thus the device is not damaged by short-circuiting at an unintended portion.

A distance L4 between the distal end of the nozzle 16 and the blocking member 48 is not particularly limited. However, in consideration of a blocking region of the blocking member 48 and a moving length of the blocking member 48, it is preferable that the distance L4 between the distal end of the nozzle 16 and the blocking member 48 is about half of the distance L2 between the nozzle 16 and the collector 50.

Depending on the voltage applied to the nozzle 16 and the collector 50, the thickness of the obtained nanofibers 46 varies. From the viewpoint of forming fine fibers, it is preferable that the voltage is as low as possible. In a case where the voltage is excessively low, not fibers but balls are formed and may be attached to the collector 50. Conversely, as the voltage increases, the thickness of the fibers increases, and in a case where the voltage is excessively high, insulation breakdown occurs in the device, and short-circuiting occurs at an unintended portion, which may damage the device. Therefore, the voltage applied between the nozzle 16 and the collector 50 is preferably 2 kV to 40 kV.

It is preferable that the voltage applied between the nozzle 16 and the blocking member 48 is reduced as the distance between the blocking member 48 and the nozzle 16 decreases, but the applied voltage is not limited thereto. For example, the voltage applied between the nozzle 16 and the blocking member 48 may be higher than or equal to the voltage applied between the nozzle 16 and the collector 50.

As the cellulose polymer, cellulose triacetate (TAC) is used in the embodiment, but the cellulose polymer is not limited thereto. For example, at least one of cellulose diacetate (DAC), cellulose propionate, cellulose butyrate, cellulose acetate propionate, nitrocellulose, ethyl cellulose, or carboxymethylethyl cellulose, or a mixture thereof may be used. In the above-described example, TAC is used as the solution. However, the solution may be another polymer solution.

Examples of the solvent for dissolving the cellulose polymer include methanol, ethanol, isopropanol, butanol, benzyl alcohol, acetone, methyl ethyl ketone, cyclohexanone, methyl acetate, ethyl acetate, propyl acetate, butyl acetate, methyl formate, ethyl formate, hexane, cyclohexane, dichloromethane, chloroform, carbon tetrachloride, benzene, toluene, xylene, dimethylformamide, N-methylpyrrolidone (NMP), diethyl ether, dioxane, tetrahydrofuran, and 1-methoxy-2-propanol. Among these, one kind may be used alone, or a mixture of two or more kinds may be used according to the kind of the cellulose polymer. In a case where one solvent is used and the boiling point of the solvent is substantially 50° C. or lower, the occurrence of skinning becomes significant. In addition, since the evaporation rate of a solvent having a low boiling point is fast, skinning is likely to occur in this solvent. In order to prevent this problem, it is preferable that a solvent having a low boiling point is mixed with a solvent having a high boiling point to adjust the evaporation rate of the solvent. In this embodiment, the solution 25 in which cellulose triacetate is dissolved in a mixed solvent is used. In the mixed solvent, a mixing ratio (mass ratio; dichloromethane:NMP) of dichloromethane to NMP is set as 8:2, and the concentration of the cellulose triacetate solution is set as 4 mass %.

Next, the operation of the embodiment will be described. In FIG. 1, the blocking member 48 is set at the insertion position. In addition, the collection portion 15 is operated, and the collector 50 and the support 60 are moved. By operating the solution supply portion 12 to supply the solution 25 from the distal end opening 16b of the nozzle 16 as shown in FIG. 2, the Taylor cone 44 is formed at the distal end opening 16b. As shown in FIG. 1, in a case where the power supply portion 62 is switched on and the voltage applied to the blocking member 48 increases, the electrospinning jet 45 is sprayed from the Taylor cone 44 to the blocking member 48. The electrospinning jet 45 is broken into fine nanofibers 46 by electrical charges thereof.

After a given time required for the electrospinning jet 45 to be stably formed, the blocking member 48 is moved from the insertion position to the retreat position. When a distal end of the blocking member 48 passes the spraying area 42 of the electrospinning jet 45, the voltage application between the nozzle 16 and the blocking member 48 is switched to the voltage application between nozzle 16 and the collector 50. As a result, the electrospinning jet 45 is sprayed to the collector 50 and is converted into the nanofibers 46 during the spraying. The nanofibers 46 are collected on the support 60 moving on the collector 50 as the nanofiber layer 47 in the form of non-woven fabric.

Immediately after the start of electrospinning, the blocking member 48 is inserted into the spraying area 42 of the electrospinning jet 45 such that an unstable electrospinning jet 45 or unstable nanofibers 46 formed immediately after electrospinning are received by the blocking member 48. In addition, even in a case where liquid falling occurs immediately after electrospinning, the solution is also received by the blocking member 48. The unstable electrospinning jet 45 or the solution during liquid falling from which a defective product is likely to be manufactured is not sprayed to the collector 50. Therefore, the manufacturing of a defective product is prevented. In addition, a period of time in which the blocking member 48 moves in the spraying area 42 is short. Therefore, deterioration in the quality of non-woven fabric caused by an uneven distribution of the electrospinning jet 45 or the nanofibers 46 does not occur.

The collected nanofibers 46 are supplied as the nanofiber layer 47 to the support winding portion 53 along with the support 60. The nanofiber layer 47 is wound around the core 61 in a state where it is laminated on the support 60. After the core 61 is removed from the winding shaft 58, the nanofiber layer 47 is separated from the support 60. Next, the nanofiber layer 47 is cut in a desired size, and non-woven fabric formed of the nanofibers 46 is obtained.

In a case where electrospinning is stopped, the blocking member 48 is inserted into the spraying area 42 of the electrospinning jet 45. When the distal end of the blocking member 48 reaches the spraying area 42 of the electrospinning jet 45, the voltage application between nozzle 16 and the collector 50 is switched to the voltage application between the nozzle 16 and the blocking member 48. As a result, the electrospinning jet 45 is sprayed to the blocking member 48 such that the electrospinning jet 45 and the nanofiber 46 are received by the blocking member 48. After the blocking member 48 is completely inserted into the spraying area 42 of the electrospinning jet 45, the voltage application between the nozzle 16 and the blocking member 48 is stopped. In this way, the blocking member 48 covers the collector 50 provided below the blocking member 48. Therefore, even in a case where the solution falls from the nozzle 16 or an unstable electrospinning jet or unstable nanofibers are formed, the solution, the unstable electrospinning jet, or unstable nanofibers are received by the blocking member 48, and the manufacturing of a defective product is prevented.

In the above-described embodiment, when the distal end of the blocking member 48 is inserted into the spraying area 42 of the electrospinning jet 45 (concurrently with the insertion), the voltage is applied, but the present invention is not limited thereto. The voltage may be applied with a short time lag before the distal end of the blocking member 48 enters the spraying area 42. Likewise, in a case where the blocking member 48 retreats, the voltage application may be stopped with a short time lag after the distal end of the blocking member 48 passes the spraying area 42.

Figure 3:
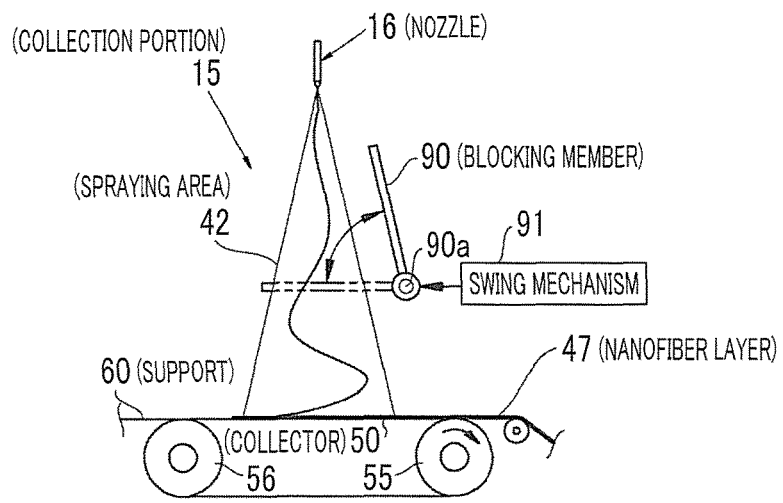
FIG. 3 is a side view showing a collection portion according to another embodiment in which a swing-type blocking member is used.

In the above-described embodiment, the blocking member 48 is configured to be movable in a horizontal direction parallel to the collector 50. However, as shown in FIG. 3, a swing type blocking member 90 having a swing shaft 90a may be used. In this case, a swing mechanism 91 allows the blocking member 90 to stand up or lie down, a position where the blocking member 90 stands up is set as the retreat position, and a position where the blocking member 90 lies down is set as the insertion position.

Figure 4:
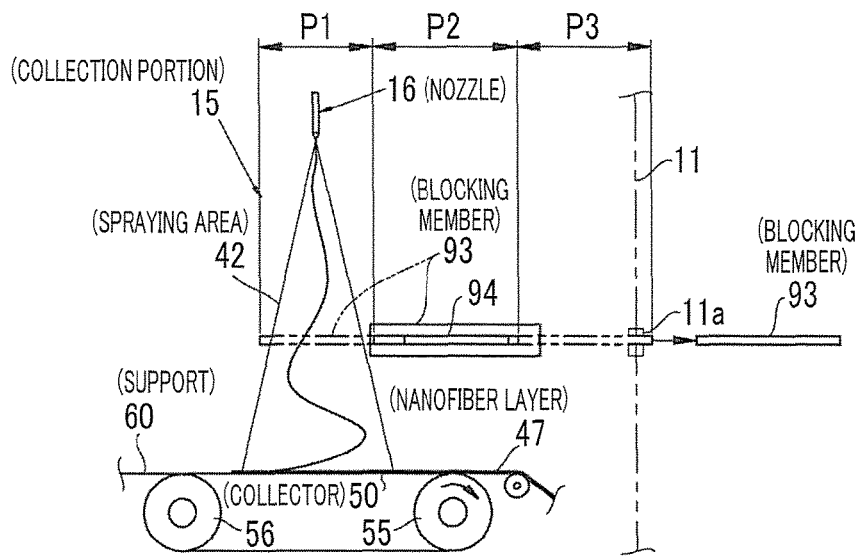
FIG. 4 is a side view showing a collection portion according to another embodiment in which a blocking member is discharged outside of an electrospinning chamber.

In the above-described embodiment, the blocking member 48 or 90 horizontally moves or swings in the electrospinning chamber 11 so as to switch between the insertion position and the retreat position. However, in addition to the above positions, a waste position P3 may be further provided as moving positions of the blocking member 93 as shown by a two-dot chain line in FIG. 4. In this case, a shift mechanism 94 allows the blocking member 90 to switch between an insertion position P1 and a retreat position P2 and further allows the blocking member 93 at the retreat position P2 to horizontally move to the waste position P3 opposite to the insertion position P1. The shift mechanism 94 allows the blocking member 93 to horizontally move using a rack-and-pinion mechanism, a link mechanism, or the like (not shown). At the waste position P3, the blocking member 93 protrudes to the outside through an opening 11a with a shutter which is provided in the electrospinning chamber 11. The protruding blocking member 93 is pulled out from the opening 11a, waste fibers accumulating on the blocking member 93 are removed, and then the blocking member 93 is returned into the electrospinning chamber 11 through the opening 11a.

In the embodiment, as shown in FIG. 2, the resin layer 26 formed of PTFE is formed on the distal end portion of the nozzle 16. Therefore, the critical surface tension is 18 mN/m, and an effect of reducing the attachment of the solution 25 is obtained. For example, the attachment of the solution 25 is reduced as compared to a case where a metal member is exposed to the surface as it is and the critical surface tension is 1000 mN/m. As a result, like a Taylor cone 44 indicated by a two-dot chain line in FIG. 2, the solution 25 is prevented from spreading. In a case where the solution 25 spreads, the solution 25 remains in a spreading portion 25a. Therefore, the solvent evaporates over time, and skinning is likely to occur. In the embodiment, the occurrence of skinning is prevented by preventing the spreading of the solution 25.

Figure 5:
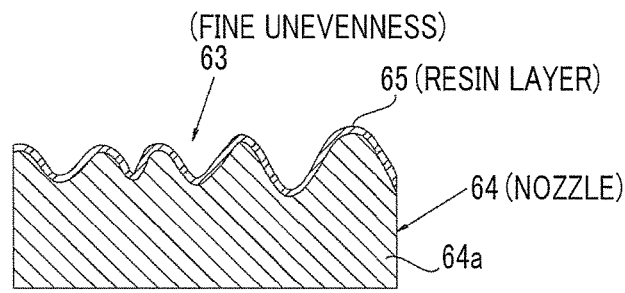
FIG. 5 is an enlarged cross-sectional view showing a part of a resin layer of another nozzle.

As in the case of a nozzle 64 shown in FIG. 5, a fine unevenness 63 may be formed on a surface of a nozzle main body 64a. The fine unevenness 63 is formed, for example, by performing blasting on a distal end portion of the nozzle 64. Next, a processed surface on which the fine unevenness 63 is formed is coated with a resin layer 65 formed of PTFE. It is preferable that the surface roughness Ra obtained by the coated fine unevenness 63 is 0.2 μm to 1 μm. By adjusting the surface roughness Ra to be 0.2 μm or more, a surface-roughening effect can be exhibited as compared to a case where the surface roughness Ra is less than 0.2 μm. In addition, by adjusting the surface roughness Ra to be 1 μm or less, the peeling of the solution is promoted as compared to a case where the surface roughness Ra is more than 1 μm. The surface roughness Ra can be obtained using a surface roughness meter based on JIS B 0601.

Figure 6:
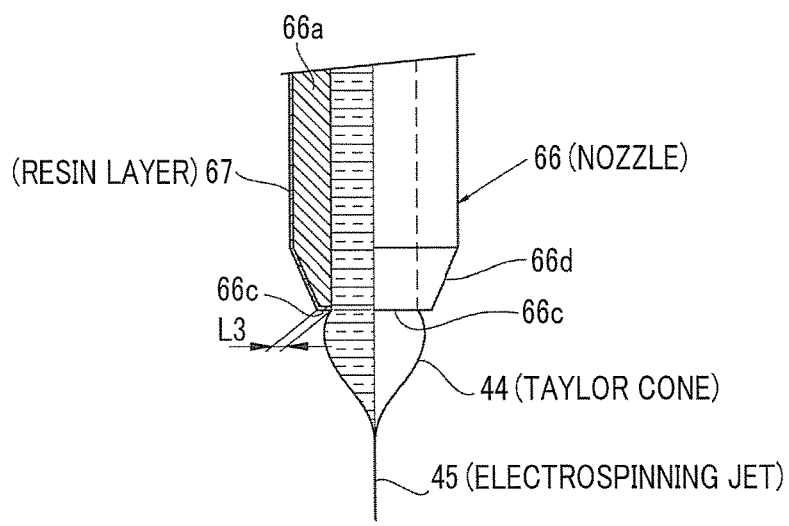
FIG. 6 is a side view showing a partial cross-section of a distal end portion of another nozzle.

In addition, as in the case of a nozzle 66 shown in FIG. 6, a length (flat length) L3 of the distal end flat surface 66c in a direction perpendicular to the core (center line) may be set to be 0.05 mm to 1 mm. In this case, a contracted surface 66d is formed in a tapered shape in which the diameter of an outer circumferential surface of a distal end portion of the nozzle 66 gradually decreases toward the distal end portion.

In particular, by polishing the distal end of the nozzle 66 in a flat shape, the flat length L3 of the distal end flat surface 66c can be easily made to be, for example, 0.10 mm or less.

In a case where the flat length L3 of the distal end flat surface 66c is less than 0.05 mm, processing for securing a given length is difficult to perform. In addition, in a case where the flat length L3 of the distal end flat surface 66c is more than 1 mm, the effect of preventing the spreading of the solution 25 is reduced, which is not preferable. By adjusting the flat length L3 to be 0.05 mm to 1 mm, the spreading of the solution 25 can be restricted in a range of the flat length L3. As a result, the occurrence of skinning in the spreading portion 25a where the solution 25 spreads is prevented. In particular, by adjusting the flat length L3 to be 0.05 mm to 0.10 mm, the volume of the spreading portion 25a can be reduced, the remaining of the solution 25 is also reduced, and the occurrence of skinning is more reliably prevented. Although not shown in the drawing, a nozzle in which the surface roughness Ra and the flat length L3 are in the above-described predetermined ranges may be used. In addition, in the nozzle 16, 64, or 66, the distal end portion of the metal nozzle main body 16a, 64a, or 66a is coated with the resin layer 26, 65, or 67. However, in the case of a solution which is less likely to be affected by skinning, a nozzle in which the resin layer 26, 65, or 67 is not provided may be used.

In the above description, one nozzle 16, 64, or 66 is used. However, plural nozzles 16, 64, or 66 may be used. In a case where plural nozzles 16, 64, or 66 are used, it is preferable that the nozzles 16, 64, or 66 may be provided at intervals in a feed direction of the support 60 or in a direction perpendicular to the feed direction. In addition, the nozzles 16, 64, or 66 may be disposed in a matrix shape in the feed direction of the support 60 or in a direction perpendicular to the feed direction. By providing the plural nozzles 16, 64, or 66, the area of the obtained nanofiber layer 47 can be increased, and the manufacturing efficiency can be increased. In addition, in a case where the total amount of the solution jetted from the nozzles 16, 64, or 66 is increased by increasing the number of nozzles 16, 64, or 66, it is preferable that a solvent recovery portion (not shown) is provided in the electrospinning chamber 11.

In the above-described embodiment, a cross-sectional shape of the distal end opening of the nozzle 16 or 66 is circular but may be an elongated rectangular slit shape (not shown).

As the collector 50, a belt which circulates and moves is used. However, the collector is not limited to a belt. For example, the collector may be a fixed flat plate or a cylindrical rotating body. Even in this case, the blocking member is disposed between the nozzle and the collector so as to be movable between the retreat position and the insertion position. In a case where the collector is a flat plate or a cylindrical body, it is preferable that a support such as an aluminum sheet is used on the collector such that non-woven fabric can be easily separated from the collector. In a case where a rotating body is used, cylindrical nanofiber non-woven fabric is formed on a circumferential surface of the rotating body. Therefore, after electrospinning, the cylindrical nanofibers are removed from the rotating body and are cut into a desired size and a desired shape, and thus a nanofiber non-woven fabric product can be obtained. In a case where a cylindrical rotating body is used, nanofiber non-woven fabric cannot be continuously manufactured. However, a uniform quality product is likely to be manufactured and is easily applicable to a cell culture scaffold, medical applications, and the like. In addition, by increasing the rotation speed of the cylinder, the orientation degree of nanofibers can be improved, and an anisotropic product can be manufactured.

In the above-described embodiment, the blocking member 48 is positioned at the retreat position during the manufacturing of the fibers, and the blocking member 48 is positioned at the insertion position at the start and end of the manufacturing of the fibers. However, in a case where a nozzle cleaning mechanism (not shown) is provided, it is preferable that the blocking member 48 is positioned at the insertion position during cleaning. In addition, for example, in the case of emergency stop in which skinning occurs in the nozzle, it is preferable that the blocking member 48 is positioned at the insertion position.

In the above-described embodiment, all the members are disposed in the electrospinning chamber 11. However, in order to minimize the electrospinning chamber 11, for example, the storage container 30, the pump 31, the shift mechanism 49, or the motor 57 may be disposed outside the electrospinning chamber 11.

EXPLANATION OF REFERENCES

10: nanofiber manufacturing device
11: electrospinning chamber
12: solution supply portion
15: collection portion
16, 64, 66: nozzle
16a, 64a, 66a: nozzle main body
16c, 66c: distal end flat surface
25: solution
26, 65, 67: resin layer
42: spraying area
44: Taylor cone
45: electro spinning jet
46: nanofiber
47: nanofiber layer
48, 90, 93: blocking member
49, 94: shift mechanism
50: collector
62: power supply portion
L2, L4: distance
L3: flat length

What is claimed is:

1. A nanofiber manufacturing method comprising:
   supplying a solution in which a polymer is dissolved in a solvent from a distal end of a nozzle;
   applying a voltage between the solution and a collector; and
   spraying fibers from the solution to the collector,
   wherein a blocking member is disposed so as to be movable between an insertion position, where the blocking member is inserted between the nozzle and the collector such that the fibers are received, and a retreat position, where the blocking member retreats from the insertion position such that the fibers are sprayed from the nozzle to the collector, and
   a voltage is applied between the nozzle and the blocking member in a state where the blocking member is positioned at the insertion position.

2. The nanofiber manufacturing method according to claim 1, wherein the blocking member is positioned at the retreat position during the manufacturing of the fibers, and
   the blocking member is positioned at the insertion position at the start and end of the manufacturing of the fibers.

3. The nanofiber manufacturing method according to claim 1, wherein the voltage is applied in a state where a distal end of the blocking member reaches a spraying area of the fibers, and the voltage application is stopped in a state where the distal end of the blocking member passes the spraying area.

4. The nanofiber manufacturing method according to claim 2, wherein the voltage is applied in a state where a distal end of the blocking member reaches a spraying area of the fibers, and the voltage application is stopped in a state where the distal end of the blocking member passes the spraying area.

5. The nanofiber manufacturing method according to claim 3, wherein the voltage application between the solution and the collector is stopped in a state where the voltage is applied between the solution and the blocking member.

6. The nanofiber manufacturing method according to claim 4, wherein the voltage application between the solution and the collector is stopped in a state where the voltage is applied between the solution and the blocking member.

7. The nanofiber manufacturing method according to claim 1, wherein the polymer is a cellulose polymer.

8. The nanofiber manufacturing method according to claim 2, wherein the polymer is a cellulose polymer.

9. The nanofiber manufacturing method according to claim 3, wherein the polymer is a cellulose polymer.

10. The nanofiber manufacturing method according to claim 4, wherein the polymer is a cellulose polymer.

11. The nanofiber manufacturing method according to claim 5, wherein the polymer is a cellulose polymer.

12. The nanofiber manufacturing method according to claim 6, wherein the polymer is a cellulose polymer.

* * * * *